July 6, 1943. D. SILVERMAN Re. 22,344

IGNITION SYSTEM

Original Filed Feb. 14, 1934

WITNESSES:

E. A. McSlarkey

S. A. Stickler

INVENTOR

Daniel Silverman.

BY O. B. Buchanan

ATTORNEY

Reissued July 6, 1943

Re. 22,344

UNITED STATES PATENT OFFICE 22,344

IGNITION SYSTEM

Daniel Silverman, Tulsa, Okla., assignor to Westinghouse Electric & Manufacturing Company, East Pittsburgh, Pa., a corporation of Pennsylvania Original No. 2,005,875, dated June 25, 1935, Serial No. 711,192, February 14, 1934. Application for reissue May 23, 1940, Serial No. 336,888

25 Claims. (Cl. 315—146)

My invention relates to vapor electric converters and particularly to an ignition system for such devices.

In the application of vapor-electric devices employing a make-alive type of excitation it is frequently desirable to operate a plurality of elements in parallel instead of constructing a single special unit for delivering a desired current rating.

In the construction of these devices, it has heretofore been customary to provide a complete ignition system for each unit of the converters. Each of these make alive systems employs a suitable auxiliary discharge device for controlling the flow of current to the make alive electrode.

When a plurality of devices are used in parallel, all of the make alives should be energized substantially simultaneously. Consequently, it is an object of my invention to provide a make alive system by which all the make alives are energized simultaneously. Since the auxiliary discharge devices, such as glow tubes, are of relatively short life, it follows that the major portion of the up-keep cost of the ignition system is in the replacement of these auxiliary tubes.

It is a further object of my invention to reduce the number of these tubes in order to reduce the up-keep cost of make alive installations.

It is a further object of my invention to provide current dividing apparatus for insuring current flow to all of a plurality of parallel connected make alive electrodes.

It is a further object of my invention to provide means for substantially stopping the current flow in the make alive electrode after it has established the arc in the main discharge device.

Figure 1:
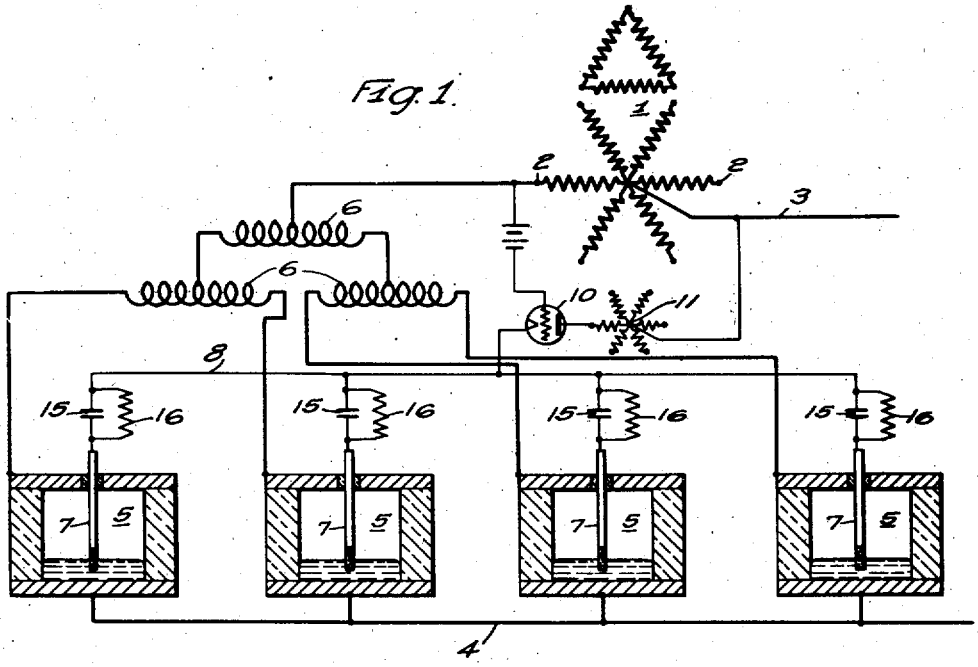
Figure 2:
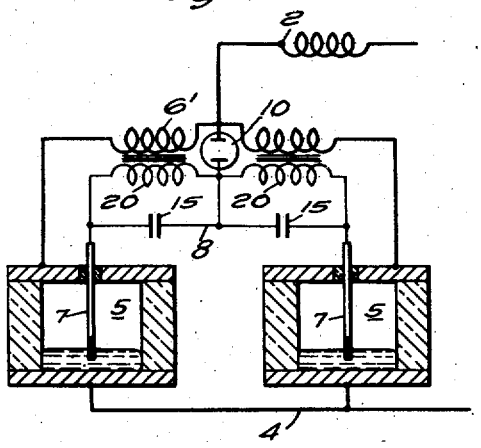
Figure 3:
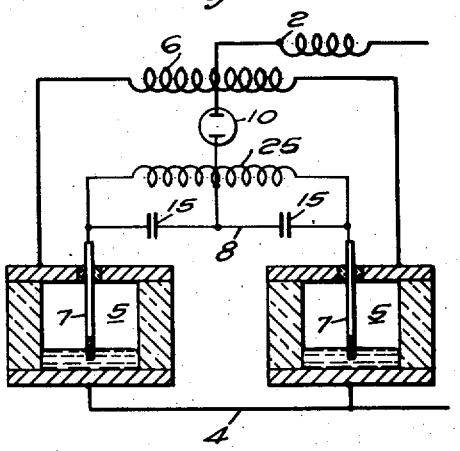

Other objects and advantages of my invention will be apparent from the following detailed description taken in conjunction with the accompanying drawing, in which Figure 1 is a schematic illustration of a portion of a converter installation embodying my invention, Fig. 2 is a similar view showing a further modification according to my invention, and Fig. 3 is a similar view of a similar embodiment of my invention.

The apparatus according to my invention comprises a suitable alternating current system such as an alternating current transformer 1 provided with a plurality of phase terminals 2, a direct current system having one side 3 thereof connected to the alternating current system and a plurality of converters between each phase terminal 2 of the alternating current system 1 and one side 4 of the direct current line.

Each of the converters 5 between the common phase terminal 2 and the alternating current line 3 are connected in parallel by means of suitable current dividing equipment such as anode balance coils 6. In each of the converters 5 is a suitable make alive electrode 7 for initiating a cathode spot at the beginning of each current carrying half cycle.

These make alive electrodes 7 are connected in parallel by a suitable conductor 8 and supplied with current by a suitable auxiliary valve 10 which is, in turn, supplied either from an auxiliary source 11 or from the phase terminal 2 to which the valves 5 are connected. When the potential applied to the anodes of the converter 5 is positive, the auxiliary valve 10 will break down to permit current flow to the parallel connected make alives 7 which, in turn, create a cathode spot and initiate the main current carrying arcs in the converter. This so reduces the potential applied to the auxiliary valve 10 that current flow to the make alives is interrupted.

In the commercial construction of make alive electrodes, it is found substantially impossible to provide a plurality of electrodes with substantially identical characteristics so that the current will divide equally between the various parallel connected electrodes. In order to obviate this difficulty, I introduce a current dividing device between the electrodes and a common source of electrode current.

In the preferred embodiment of my invention, I provide a suitable capacitor 15 in series with each of the make alive electrodes 7 and when make alive potential is applied to the electrodes 7, current starts to flow in each electrode 7 substantially equal to the charging current taken by the several capacitors 15. This current continues to flow until a cathode spot is established at which time an arc will strike from the electrode holder to the cathode spot. This causes a rush of current which rapidly charges the series capacitor 15 and so substantially interrupts current flow to that particular electrode. If one of the parallel connected electrodes 7 should fail to create its cathode spot, the current from the excitation source will continue to flow to that electrode and also the potential stored in the remaining capacitors 15 will be available for creating a cathode spot in the late firing unit. In order to discharge the series capacitor 15, I provide a resistor 16 in shunt therewith. These resistors 16 dissipate the charge of the capacitor 15 so that at each succeeding half cycle, the capacitor 15 will be able to carry current to its associated make alive electrode 7.

In certain applications where the make alive requirements are particularly heavy, it is desirable to provide means for increasing the potential applied to a non-firing unit.

In the modification according to Fig. 2, I have provided in parallel with the series capacitors 15 a suitable balancing transformer 20. When the positive potential is applied to the anode circuit, the auxiliary valve 10 allows current to flow to the common connection 8 of the make alive electrodes 7. Because of the relatively high inductance of the transformer winding 20, make alive current is carried substantially entirely by the series capacitors 15. As soon as one of the electrodes 7 has initiated a rectifying arc, current will flow through the main balancing reactor 6' of the active unit and set up in itself a back voltage which increases the potential applied to the anode of the non-firing unit.

Closely associated with this main balance coil is the transformer winding 20 in the ignition circuit. By transformer action, the current to the active unit sets up a voltage in the coil which is positive with respect to the make alive electrode 7 of the non-firing unit. This increased potential is then effective to force sufficient current through the make alive electrode 7 to initiate a cathode spot and consequently the main rectifying arc therein. As soon as both of the converter units carry current, the potentials generated in the ignition transformer 20 counter balance each other and the flow of current to the make alive electrode 7 substantially ceases. The series capacitors 15 will then discharge through their respective sections of the ignition transformer winding 20 so as to be in readiness for initiating a cathode spot on the succeeding half cycle.

In a further modification of my invention, I use a current balancing reactor 25 to apply additional potential to the electrode of a non-firing element. In this modification when the positive potential is applied to the ignition circuit through the auxiliary valve 10, current flows primarily through the series capacitors to the make alive electrodes. However, after a short interval of time, current will flow through the parallel sections of the balancing reactor so that when the cathode spot has been initiated relatively heavy currents will flow through one half of the balancing reactor 25 to the electrode holder and from there to the cathode of the active section. By mutual induction, this current produces a relatively high potential, which is applied to the electrode 7 of the non-firing section to assist in initiating a cathode spot therein.

While for purposes of illustration, I have shown specific embodiments of my invention, it will be apparent to those skilled in the art that changes and modifications can be made therein without departing from the true spirit of my invention or the scope of the appended claims.

I claim as my invention:

1. A vapor-electric converter comprising a source of polyphase currents, a load circuit, a plurality of parallel valves between each phase of the source and the load circuit, a make-alive electrode associated with each of said valves, said electrodes being connected in parallel, a source of excitation current substantially co-phasal with the polyphase source and means responsive to the polarity of the polyphase source for connecting said excitation source to said electrodes and capacitors in series with each of said electrodes for controlling current flow thereto.

2. A vapor-electric conversion system comprising a supply line, a load line, a plurality of valves connected between common terminals on said lines, a balancing reactor for dividing the load current between said valves, a make-alive electrode in each of said valves, means for applying starting current to said electrodes, a second balancing reactor for directing current between said electrodes, said second balancing reactor being associated with said first mentioned reactor so that failure of one of said valves to pick up impresses a high potential on the make-alive in the inactive valve.

3. A vapor-electric conversion system comprising a supply line, a load line, a plurality of valves connected between common terminals on said lines, a balancing reactor for dividing the load current between said valves, a make-alive electrode in each of said valves, means for applying starting current to said electrodes, a second balancing reactor for dividing current between said electrodes, said second balancing reactor being associated with said first mentioned reactor so that failure of one of said valves to pick up impresses a high potential on the make-alive in the inactive valve and capacitors in series with said electrodes and in parallel with said second reactor.

4. An ignition system for a converter having a plurality of parallel valves comprising a make-alive electrode in each valve, a source of current for said make-alives, means responsive to the voltages applied to said valve for connecting said source to said make-alive electrodes, a capacitor in series with each of said electrodes and means for discharging said capacitors.

5. An ignition system for a plurality of parallel connected vapor-electric valves comprising a make-alive electrode in each of said valves, a capacitor in series with each of said electrodes, a common connection to all of said capacitors and means for applying potential to said common connections at the beginning of each current carrying period.

6. An ignition system for a plurality of parallel connected vapor-electric valves comprising a make-alive electrode in each of said valves, a capacitor in series with each of said electrodes, a common connection to all of said capacitors and means for applying potential to said common connection at the beginning of each current carrying period and means in shunt with said capacitor for dissipating the energy stored therein.

7. An ignition system for a vapor-electric converter having a plurality of parallel valves comprising an auxiliary electrode for initiating a cathode spot in the valve at the beginning of each conducting interval, a source of potential connected to the parallel valves, a source of potential for said auxiliary electrodes, an auxiliary valve responsive to the polarity of the potential applied to the valve for controlling current flow to said auxiliary electrodes and a current divider for insuring current flow to each of said auxiliary electrodes.

8. An ignition system for a vapor-electric converter having a plurality of parallel valves comprising an auxiliary electrode for initiating a cathode spot in the valves at the beginning of each conducting interval, a source of potential connected to the parallel valves, a valve responsive to the polarity of the applied potential for controlling current flow to the auxiliary electrodes and means for dividing the current between the auxiliary electrodes.

9. An electrical conversion system comprising an alternating current system, a direct current system, a plurality of vapor-electric converter units for transferring energy between said systems, a make-alive electrode in each of said units, said electrodes being connected in parallel, a source of current for said make-alive electrodes, an electric valve for controlling current flow to said electrodes and current balance means for insuring current flow to each of said electrodes.

10. An excitation system for a converter having a plurality of parallel valves comprising a make-alive electrode in each of said valves, an auxiliary valve for supplying current to all of said make-alive electrodes and a split reactor for dividing current between said make-alive electrodes.

11. An excitation system for a converter having a plurality of parallel valves comprising a make-alive electrode in each of said valves, an auxiliary valve for supplying current to all of said make-alive electrodes and a split reactor for dividing current between said make-alive electrodes and a capacitor in shunt with each section of said reactor.

12. A vapor electric system comprising a source of potential, a load system, a plurality of valves for simultaneously carrying current between said source and said system, a make-alive electrode associated with each of said valves, a source of current for said electrodes, means for simultaneously applying potential to said electrodes and means for interrupting current flow to said electrodes when the cathode spots are initiated.

13. In combination, an electric valve comprising at least two principal electrodes and a control member associated with one of said principal electrodes for rendering said electric valve conductive, a source of potential, a capacitance connected in series relation with said control member and said source, means comprising an electric valve for transmitting a relatively large transient electrical impulse from said source through said control member and said capacitance to render conductive said first mentioned electric valve, and a discharge circuit connected in parallel with said capacitance.

14. In combination, an electric valve comprising at least two principal electrodes and a control member of the immersion-igniter type associated with one of said principal electrodes for rendering said electric valve conductive, means comprising a source of current and a serially-connected electric valve and a capacitance for supplying a relatively large current of short duration from said source to said control member and a discharge circuit connected in parallel with said capacitance.

15. In combination, an electric valve comprising at least two principal electrodes and a control member associated with one of said principal electrodes for rendering said electric valve conductive, means comprising a source of alternating current, a serially-connected capacitance and an electric valve for transmitting a relatively large transient electrical impulse from said source through said control member, a discharge circuit connected in parallel with said capacitance, and means for rendering said second-mentioned electric valve conductive at a predetermined potential of said alternating current source.

16. In combination, an electric valve comprising at least two principal electrodes and a control member associated with one of said principal electrodes for rendering said electric valve conductive, a source of alternating current for applying an alternating potential between said principal electrodes, and means for energizing said control member comprising an electric circuit including a capacitance connected in parallel with a series-connected inductance and resistance and an electric valve for impressing a relatively high voltage upon said control member through said electric circuit.

17. In combination, an electric valve comprising at least two principal electrodes and a control member associated with one of said principal electrodes for rendering said electric valve conductive, a source of alternating current for applying an alternating potential between said principal electrodes, means for energizing said control member comprising an electric circuit including a capacitance connected in parallel with a discharge circuit and an electric valve for furnishing a relatively large current of short duration through said control member and said capacitance, and means for rendering said second-mentioned electric valve conductive at a predetermined value of the alternating potential of said alternating current source.

18. In combination, an electric valve comprising at least two principal electrodes, a control electrode of the immersion-igniter type associated with one of said principal electrodes for rendering said electric valve conductive, a load circuit energized through said electric valve, a source of alternating current for applying an alternating potential between said principal electrodes, and means comprising in series relation an electric valve and a capacitance and a resistance connected in parallel with said capacitance for transmitting a relatively large current of short duration through said control electrode at a predetermined time in the cycle of said alternating potential.

19. In combination, an electric valve including at least two principal electrodes and a control electrode of the immersion-igniter type comprising a material having a positive non-linear volt-ampere characteristic, and an excitation circuit for energizing said control electrode comprising a source of electric current, a capacitance, means for impressing a relatively large transient voltage on said control electrode through said capacitance from said source to render said electric valve conductive and a discharge circuit connected in parallel with said capacitance.

20. In combination, an electric valve including at least two principal electrodes and a control electrode of the immersion-igniter type comprising a material having a positive non-linear volt-ampere characteristic, and an excitation circuit for energizing said control electrode comprising a source of electric current, a capacitance, means including an electric valve for impressing a relatively large transient voltage on said control electrode through said capacitance from said source to render said first-mentioned electric valve conductive and a discharge circuit connected in parallel with said capacitance.

21. In combination, an alternating current supply circuit, a direct current load circuit, and a translating circuit for supplying unidirectional current to said load circuit from said alternating current circuit comprising an electric valve including at least two principal electrodes and a control electrode of the immersion-igniter type comprising a material having a positive non-linear volt-ampere characteristic, a capacitance, means for impressing a relatively large transient voltage on said control electrode through said capacitance to render said electric valve conductive and a discharge circuit connected in parallel with said capacitance.

22. In combination, an electric valve comprising at least two principal electrodes and a control member associated with one of said principal electrodes for rendering said electric valve conductive, a source of alternating current for applying an alternating potential between said principal electrodes, and means for energizing said control member comprising an electric circuit including an capacitance connected in parallel with an inductance and an electric valve for impressing a relatively high voltage upon said control member through said electric circuit.

23. In combination, an electric discharge device having an anode, a cathode and a control member of the immersion-igniter type, an excitation circuit to energize continuously said control member during a predetermined interval of a cycle of anode-cathode voltage to initiate an arc discharge between said anode and said cathode, and means responsive to an electrical condition of said discharge device occasioned by the initiation of an arc discharge between said anode and said cathode for effecting deenergization of said control member during said predetermined interval.

24. In combination, an electric discharge device having an anode, a cathode and a control member of the immersion-igniter type, an excitation circuit tending to energize continuously said control member during a predetermined interval of a cycle of anode-cathode voltage to initiate an arc discharge between said anode and said cathode comprising means for supplying current to said control member, and means responsive to a predetermined electrical condition of said discharge device incident to the establishment of an arc discharge between said anode and said cathode for rendering said last mentioned means ineffective thereby effecting deenergization of said control member during said predetermined interval.

25. A system for supplying power from a source to a load circuit comprising, a plurality of electric discharge valves connected between said source and said load circuit, each of said valves having a pair of principal electrodes and a control electrode of the immersed igniter type, an impedance circuit having its terminals connected to the control electrodes of said valves, an auxiliary discharge device connected between said impedance circuit and said source to control the ignition of said valves.

DANIEL SILVERMAN.